(12) United States Patent
Kinlen

(10) Patent No.: US 12,180,352 B2
(45) Date of Patent: *Dec. 31, 2024

(54) COMPOSITIONS WITH COATED CARBON FIBERS AND METHODS FOR MANUFACTURING COMPOSITIONS WITH COATED CARBON FIBERS

(71) Applicant: THE BOEING COMPANY, Chicago, IL (US)

(72) Inventor: Patrick J. Kinlen, Fenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,306

(22) Filed: Oct. 17, 2022

(65) Prior Publication Data
US 2023/0045461 A1 Feb. 9, 2023

Related U.S. Application Data

(62) Division of application No. 15/792,125, filed on Oct. 24, 2017, now Pat. No. 11,472,944.

(51) Int. Cl.
*C09D 163/00* (2006.01)
*B32B 5/02* (2006.01)
(Continued)

(52) U.S. Cl.
CPC .............. *C08K 9/08* (2013.01); *B32B 5/022* (2013.01); *B32B 15/14* (2013.01); *B32B 15/18* (2013.01);
(Continued)

(58) Field of Classification Search
None
See application file for complete search history.

(56) References Cited

U.S. PATENT DOCUMENTS 3,207,731 A 9/1965 Tousignant
9,589,693 B2 3/2017 Dreezen et al.
(Continued)

OTHER PUBLICATIONS

J. Mahy, et al., The Relation Between Carbon-Fibre Surface Treatment and the Fibre Surface Microstructure, Surface and Interface Analysis, vol. 21 (1994), pp. 1-13.
(Continued)

*Primary Examiner* — Lynda Salvatore
(74) *Attorney, Agent, or Firm* — Yee & Associates, P.C.

(57) ABSTRACT

The present disclosure provides compositions including a carbon fiber material comprising one or more of dibromocyclopropyl or polysilazane disposed thereon; and a thermosetting polymer or a thermoplastic polymer. The present disclosure further provides metal substrates including a composition of the present disclosure disposed thereon. The present disclosure further provides vehicle components including a metal substrate of the present disclosure. The present disclosure further provides methods for manufacturing a vehicle component, including contacting a carbon fiber material with a polysilazane or a dibromocarbene to form a coated carbon fiber material; and mixing the coated carbon fiber material with a thermosetting polymer or a thermoplastic polymer to form a composition. Methods can further include depositing a composition of the present disclosure onto a metal substrate.

20 Claims, 3 Drawing Sheets

(51) Int. Cl.
| | |
|---|---|
| B32B 15/14 | (2006.01) |
| B32B 15/18 | (2006.01) |
| B32B 15/20 | (2006.01) |
| B32B 38/00 | (2006.01) |
| C08J 5/06 | (2006.01) |
| C08K 9/08 | (2006.01) |
| C09D 145/00 | (2006.01) |
| C09D 161/00 | (2006.01) |
| C09D 171/00 | (2006.01) |
| C09D 177/00 | (2006.01) |
| D01F 9/22 | (2006.01) |
| D01F 11/14 | (2006.01) |
| D06M 13/08 | (2006.01) |
| D06M 15/643 | (2006.01) |
| D06M 23/10 | (2006.01) |
| D06M 101/40 | (2006.01) |

(52) U.S. Cl.
CPC .......... B32B 15/20 (2013.01); B32B 38/0012 (2013.01); C08J 5/06 (2013.01); C09D 145/00 (2013.01); C09D 161/00 (2013.01); C09D 163/00 (2013.01); C09D 171/00 (2013.01); C09D 177/00 (2013.01); D01F 9/22 (2013.01); D01F 11/14 (2013.01); D06M 13/08 (2013.01); D06M 15/643 (2013.01); D06M 23/10 (2013.01); B32B 38/0036 (2013.01); B32B 2255/06 (2013.01); B32B 2260/021 (2013.01); B32B 2260/046 (2013.01); B32B 2262/106 (2013.01); B32B 2305/20 (2013.01); B32B 2311/12 (2013.01); B32B 2311/18 (2013.01); B32B 2311/30 (2013.01); B32B 2313/04 (2013.01); B32B 2603/00 (2013.01); B32B 2605/00 (2013.01); C08J 2363/00 (2013.01); C08J 2371/10 (2013.01); C08J 2379/04 (2013.01); C08J 2379/08 (2013.01); D06M 15/6436 (2013.01); D06M 2101/40 (2013.01)

(56) References Cited

U.S. PATENT DOCUMENTS

| | | | | |
|---|---|---|---|---|
| 11,472,944 | B2* | 10/2022 | Kinlen | C08K 9/08 |
| 2012/0059198 | A1 | 3/2012 | Zou et al. | |
| 2012/0277360 | A1* | 11/2012 | Scheffer | C08K 3/04 |
| | | | | 524/237 |
| 2013/0122763 | A1* | 5/2013 | Fish | B32B 5/022 |
| | | | | 428/297.4 |

OTHER PUBLICATIONS

Bing Xu, et al., Surface Modification of Polyacrylonitrile-based Carbon Fiber and Its Interaction with Imide, Applied Surface Science, vol. 253 (2006), pp. 2695-2701.

Pierre-Luc Girard-Lauriault et al., Surface Functionalization of Graphite and Carbon Nanotubes by Vacuum-ultraviolet Photochemical Reactions, Applied Surface Science, vol. 258 (2012), pp. 8448-8454.

Jyh-Ming Ting, et al., Passivation of Carbon Fiber by Diamond Deposition, Diamond and Related Materials, vol. 3 (1994), pp. 1249-1255.

Eduardo Humeres, et al., Reactivity of the Intermediates of the Reduction of SO2. Functionalization of Graphite, Graphite Oxide and Graphene Oxide, J. Phys. Org., vol. 27 (2014), pp. 344-351.

Jinyong Lee, et al., Surface Characterization and Adhesion of Carbon Fibers to Epoxy and Polycarbonate, International Journal of Adhesion & Adhesives, vol. 25 (2005), pp. 389-394.

L. H. Hihara, et al., Suppressing Galvanic Corrosion in Graphite/Aluminum Metal-Matrix Composites, Corrosion Science, vol. 34, No. 4 (1993), pp. 655-665.

Bo Xiang, et al., Hexavalent Chromium Induced Tunable Surface Functionalization of Graphite, RSC Adv., vol. 6 (2016), pp. 58354-58362.

Dhiraj Prasai, et al., Graphene: Corrosion-Inhibiting Coating, ACS Nano, vol. 6, No. 2 (2012), pp. 1102-1108.

Ikram Morcos, et al., Kinetic Studies of the Oxygen-Peroxide Couple, Technical Report No. 22, Office of Naval Research, Dec. 1, 1968, 51 pp.

Jianping Li, et al., Instant Modification of Graphite Nanosheets by the Grafting of a Styrene Oligomer Under Microwave Radiation, Journal of Applied Polymer Science, vol. 109 (2008), pp. 1377-1380.

M. Collaud Coen, et al., Functionalization of Graphite, Glassy Carbon, and Polymer Surfaces with Highly Oxidized Sulfur Species by Plasma Treatments, Journal of Applied Physics, vol. 92, No. 9 (2002), pp. 5077-5083.

Guohui Zhang, et al., Molecular Functionalization of Graphite Surfaces: Basal Plane versus Step Edge Electrochemical Activity, Journal of the American Chemical Society, vol. 136 (2014), p. 11444-11451.

A. Kozawa, et al., Effects of Various Additives in the Electrolyte on Oxygen Reduction at Ferric Phthalocyanine-Catalyzed Graphite Electrode, J. Electrochem. Soc., Oct. 1971, pp. 1705-1709.

Gregory G. Wildgoose, et al., Characterising Chemical Functionality on Carbon Surfaces, Journals of Materials Chemistry, vol. 19 (2009), pp. 4875-4886.

Raghu Srinivasan, et al., Development of Guidelines to Attenuate Galvanic Corrosion Between Mechanically-Coupled Aluminum and Carbon-Fiber Reinforced Epoxy Composites Using Insulation Layers, Journal of The Electrochemical Society, vol. 162, No. 10 (2015), pp. C545-C554.

Toby Sainsbury, et al., Covalent Carbene Functionalization of Graphene: Toward Chemical Band-Gap Manipulation, ACS Appl. Mater. Interfaces, vol. 8 (2016), pp. 4870-4877.

A. L. G. Prette, et al., Polycarbosilazane Passivation on Graphite Foll Used as Gasket Seal, IOP Conf. Series: Materials Science and Engineering, vol. 47 (2013), 7 pp.

Alan Baker, et al., Composite Materials for Aircraft Structures, American Institute of Aeronautics and Astronautics, Oct. 8, 2004, pp. 1-11, 64-67, and 364.

* cited by examiner

COMPOSITIONS WITH COATED CARBON FIBERS AND METHODS FOR MANUFACTURING COMPOSITIONS WITH COATED CARBON FIBERS

CROSS-REFERENCE TO RELATED APPLICATIONS

The present disclosure claims benefit of and priority to U.S. application Ser. No. 15/792,125 filed Oct. 24, 2017. The aforementioned patent application is hereby incoroporated by reference in its entirety.

FIELD

Aspects of the present disclosure provide compositions including coated carbon fibers, metal substrates having compositions disposed thereon, vehicle components having a metal substrate, methods for manufacturing a vehicle component by contacting a carbon fiber material with a polysilazane or a dibromocarbene and depositing a composition of the present disclosure onto a metal substrate.

BACKGROUND

Coatings that prevent metal corrosion are of importance in many industries. Metal corrosion costs U.S. industries more than $200 billion annually. Metal surfaces are important in aircraft design because they offer improved toughness as compared to ceramics. Advanced joining techniques such as laser and friction welding, automated riveting techniques, and high-speed machining also make metallic structures more affordable than ceramics.

Corrosion of a metal surface can be inhibited or controlled by introducing a protective layer onto the metal surface. Fibers, such as carbon fibers, are used in material coating layers on aircraft because of their strength. However, when carbon fibers, such as graphite, from composites come in contact with an active metal material, such as aluminum, corrosion can be initiated through a galvanic interaction where oxygen reduced at the graphite surface encourages corrosion/oxidation of the metal surface.

To ameliorate this interaction, the metal is separated from the carbon fiber coating using one or more insulating fiberglass layers, typically containing glass/epoxy or aramid/epoxy. However, use of fiberglass barriers increases cost of material, fabrication costs, production rate losses, and increases the weight of the overall structure it becomes a part of, such as an aircraft.

There is a need for carbon fiber coatings that do not promote corrosion of a metal substrate and methods for manufacturing vehicle components having carbon fiber coatings disposed thereon.

SUMMARY

The present disclosure provides a composition including a carbon fiber material comprising one or more of dibromocyclopropyl or polysilazane disposed thereon; and a thermosetting polymer or a thermoplastic polymer.

In other aspects, a metal substrate includes a composition of the present disclosure disposed thereon. A vehicle component can include a metal substrate of the present disclosure.

The present disclosure further provides a method for manufacturing a vehicle component including contacting a carbon fiber material with a polysilazane or a dibromocarbene to form a coated carbon fiber material; and mixing the coated carbon fiber material with a thermosetting polymer or a thermoplastic polymer to form a composition.

In other aspects, a method includes depositing a composition of the present disclosure onto a metal substrate.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
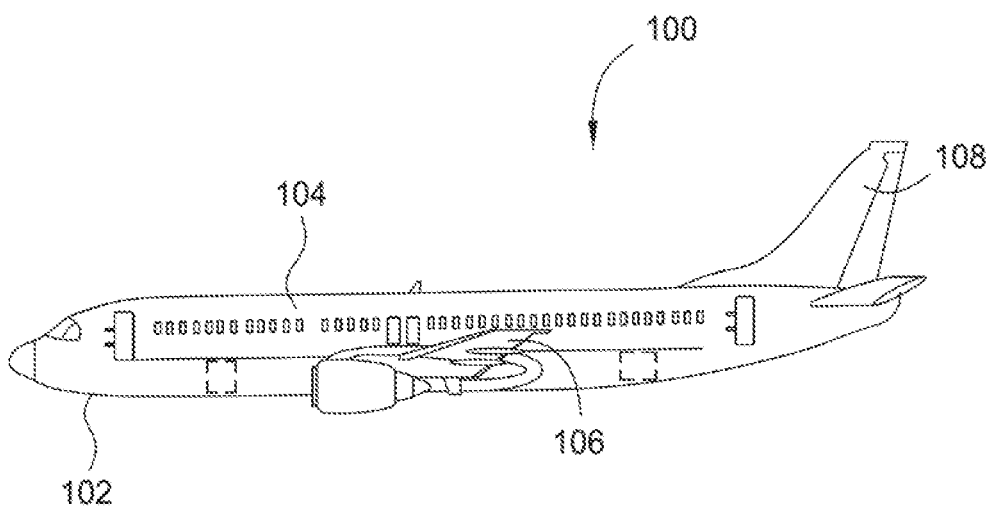
FIG. 1 is an aircraft comprising vehicle components according to one aspect.

The present disclosure provides compositions including a thermosetting or thermoplastic polymer and a coated graphite fiber. The present disclosure further provides metal substrates having a composition of the present disclosure disposed thereon. As used herein, a metal substrate includes pure metal substrates and metal-containing substrates. Methods for manufacturing metal structures include contacting (e.g., passivating) a carbon fiber (such as graphite) with a polysilazane or dibromocarbene, mixing the coated carbon fiber with a thermosetting or thermoplastic polymer to form a composition, and depositing the composition onto a metal substrate. As used herein, "composition" includes a mixture of components (such as a carbon fiber material and a polysilazane) and/or the reaction product(s) of the components. Compositions and methods of the present disclosure provide corrosion inhibition of a metal substrate and, in aspects where the metal substrate is an aircraft component, a composition disposed on a metal substrate without the need for an intermediate fiberglass layer between the metal substrate and the composition. Without being bound by theory, compositions of the present disclosure can provide a coating that inhibits oxygen reduction of a metal substrate by bonding the coating on the surface of the carbon fiber to form a passivated carbon fiber. The passivated carbon fiber provides a barrier to electron transfer to the metal substrate. Carbon fiber coatings can covalently bond to the carbon fiber, unlike conventional approaches, such as fiberglass intermediate layers, that focus on blocking corrosion/oxidation occurring on the metal surface. This solution solves the galvanic process by inhibiting the oxygen reduction reaction.

Compositions and Metal Substrates

Compositions of the present disclosure include one or more carbon fiber materials and one or more polymers. The carbon fiber materials have one or more dibromocyclopropyls or polysilazanes disposed thereon (e.g., covalently bonded to the carbon fiber material or non-covalently interacting with the carbon fiber material). Carbon fiber material includes carbon fibers and carbon fiber composites. A composite is solid material having at least two phase-separated constituents with differing intrinsic properties. For example, a composite can be a three dimensional structure of fibers, such as carbon fibers, comingled together (e.g. woven), can be unidirectional tape, or can be a single ply of material. A composite has a composite structure selected from a mat, a tow, a laminate (a layered structure or a ply), a braid, or a filament. Carbon fibers include graphite, graphene, or carbon nanotubes. In at least one aspect, a carbon fiber is graphite.

A polymer of the present disclosure includes at least one of a thermosetting polymer or a thermoplastic polymer. In at least one aspect, a polymer is at least one of an epoxy, a bismaleimide, a polyimide, or a polyaryletherketone. Epoxies are thermosets that can provide durable coatings on a component, such as a vehicle component, such as an aircraft component. Bismaleimide resins have desirable formability and mechanical properties similar to epoxies and can operate at higher temperatures than epoxies. Polyaryletherketones are thermoplastics that can provide adhesion of a composition of the present disclosure to a component and can also withstand chemical, thermal, and physical conditions experienced by a vehicle if the component is a vehicle component. Polyimides have higher strains to failure than thermoset polymers because thermoplastic polymers can undergo plastic deformation.

In at least one aspect, a composition of the present disclosure includes the carbon fiber material from about 1 wt % to about 80 wt %, such as from about 20 wt % to about 75 wt %, such as from about 50 wt % to about 70 wt %, such as from about 60 wt % to about 65 wt %, based on the total weight of the composition. In at least one aspect, a composition of the present disclosure includes a polymer from about 1 wt % to about 99 wt %, such as from about 5 wt % to about 60 wt %, such as from about 30 wt % to about 60 wt %, such as from about 40 wt % to about 50 wt %, for example about 35 wt %, based on the total weight of the composition. The carbon fiber material of the present disclosure provides strength to the composition.

In at least one aspect, a metal substrate includes a composition of the present disclosure disposed thereon. Metal substrates include steel, aluminum, titanium, magnesium, tantalum, copper, and alloys thereof. A composition can be disposed on a metal substrate, where the composition has a thickness of from about 1 micron to about 1 millimeter, such as from about 1 micron to about 100 microns, such as from about 1 micron to about 10 microns. The thickness of a composition of the present disclosure disposed on a substrate can be sufficiently thin so as not to add significant weight to the coated substrate but nonetheless provide an adequate amount of composition to provide other benefits, such as corrosion protection of the substrate. A metal substrate can be, or form a component of, a vehicle component. A vehicle component is a component of a vehicle, such as a structural component, such as landing gear(s), a panel, or joint, of an aircraft. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

FIG. 1 is an aircraft comprising vehicle components, according to at least one aspect of the present disclosure. As shown in FIG. 1, aircraft 100 includes an aircraft structure 102 including vehicle components such as an elongated body 104, a wing 106 extending laterally from the body 104, and a tail 108 extending longitudinally from the body 104. Compositions of the present disclosure can be disposed on one or more surfaces of these aircraft components to form one or more aircraft component(s) having a composition disposed thereon.

Alternatively, compositions of the present disclosure can be disposed on one or more surfaces of wind turbines, satellites, or other vehicles such as cars, boats, and the like.

Carbon Fiber Formation

Figure 2:
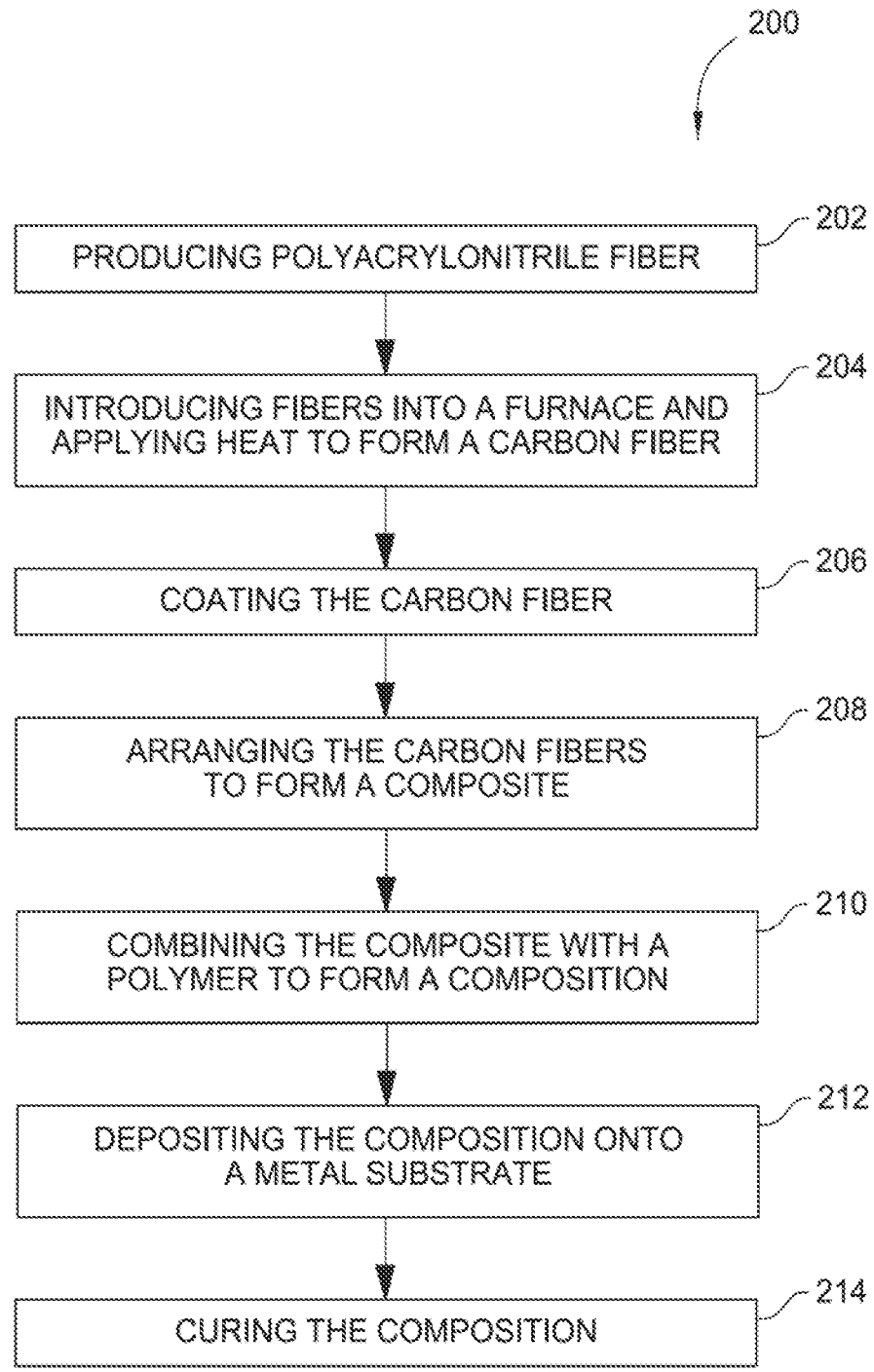
FIG. 2 is a flow diagram of a method for manufacturing components having passivated carbon fiber coatings, according to one aspect.

Fibers of the present disclosure include graphene, graphite, and carbon nanotubes. In at least one aspect, a carbon fiber is graphite. FIG. 2 is a flow diagram of a method 200 for manufacturing vehicle components having passivated graphite fiber-containing coatings disposed thereon. Graphite can be produced from a polyacrylonitrile fiber. As shown at block 202, method 200 includes producing polyacrylonitrile (PAN) (an acrylic textile fiber) by wet spinning or dry spinning of the PAN polymer. Dry spinning produces round smooth fibers whereas wet spinning (extrusion into a coagulating bath) produces a variety of "non-circular" cross-sections, including dog-bone, elliptical, and kidney-shaped cross-sections. These non-circular cross-sections provide larger relative surface area to improve effective bonding. The fibers can be stretched during the spinning process. The greater the stretch, the smaller the fiber diameter and the higher the preferred orientation of the molecular chain along the fiber axis, resulting in a stiffer carbon fiber when processed. PAN fiber tows can contain from about $10^3$ fibers to about $10^5$ fibers, for example about $10^4$ fibers. To form the carbon fibers (e.g., graphite), PAN is first stabilized in air at about 250° C. by oxidation. At this point, PAN has a glass transition temperature (Tg) sufficient to resist melting at higher temperatures. The fibers are maintained under tension during the stabilization to prevent them from contracting during oxidation and, through the resulting deformation, to align further into a ladder structure with the fiber axis. The material is then carbonized at a temperature from about 1200° C. to 1600° C. in an inert atmosphere, such as inert gas, such as a nitrogen. As this heat treatment proceeds, benzene aromatic rings link to form polynuclear aromatic fragments (e.g., a more graphite-like structure). Gradually the aromatic network transforms to mainly carbon atoms and becomes denser through cross-linking with the evolution of $N_2$ through open pores in the fiber. If the heat treatment is performed at 1500-1600° C., the strain capability of the fibers is then over 1.5% with an intermediate value of the Young's modulus of around 240 GPa.

If a higher modulus is desired, which will lower strength and strain capability of the fibers, the fibers can undergo a final graphitization stage of heat treatment. As shown at block 204, method 200 includes introducing the fibers into a furnace (such as a graphitization furnace) and heating the furnace to a temperature from about 2,000° C. to about 2,700° C., for example about 2500° C. The graphitization heat treatment can occur in an inert atmosphere, such as inert gas, such as argon, which reduces or prevents the formation of imperfections in the fiber. During this process, the aromatic carbon basal layer planes grow, by further coalescence of adjacent layers, resulting in an increase in planar orientation of the fiber into a fiber having a graphite morphology, and thus a more elastic modulus (e.g., from about 300 GPa to about 400 GPa, such as about 380 GPa), as compared to the fiber material that has not undergone this graphitization heat treatment. The carbon fibers produced herein can have a filament diameter of from about 1 μm to about 20 μm, such as about 8 μm and can form a tow (bundle of filaments) having from about $2 \times 10^4$ of filaments to about $3 \times 10^4$ of filaments, such as $2.5 \times 10^4$ of filaments. Carbon fibers of the present disclosure can have a thickness of from about 1 μm to about 1 mm, such as from about 1 μm to about 10 μm, and a density of from about 0.5 g/cm³ to about 1 g/cm³, such as about 0.7 g/cm³.

Passivating Carbon Fiber

As shown at block 206, method 200 includes coating a carbon fiber. Coating the carbon fiber can include a polysilazane passivation process or a dibromocarbene passivation process.

Polysilazane Passivation:

In a polysilazane passivation process, a polysilazane polymer coating can be directly applied to a fiber surface. The coating reactant can be applied directly as a surface finish or the fiber surface can be slightly oxidized to form —OH groups on the fiber. Without being bound by theory, the —OH moieties can be reactive anchors to form covalent bonds with the polymer coating.

Optionally, the first stage of a polysilazane passivation process includes contacting the carbon fiber (e.g., graphite fiber) with an acid in order to oxidize the surface of the carbon fiber. Strong acids include nitric acid, hydrochloric acid, and sulfuric acid. In at least one aspect, the acid is nitric acid. In at least one aspect, contacting the carbon fiber with an acid includes dipping the carbon fiber into a solution of the acid. The concentration of the acid in the solution can be from about 0.001 moles of acid per liter of water (M) to about 1M, such as from about 0.1 M to about 1 M.

In at least one aspect, the carbon fiber (e.g., graphite fiber) is introduced to the strong acid soon after the carbon fiber is removed from the furnace of block 204 such that the carbon fiber is at elevated temperature from the furnace when the carbon fiber is introduced to the acid. This aspect provides reduced production costs by reducing or eliminating reheating (energy consumption) of the carbon fiber upon treatment with an acid.

Immersion time of the carbon fiber in the acid solution can be from about 0.5 seconds to about 1 minute, for example about 10 seconds. The carbon fiber is removed from the acid solution at a rate from about 0.1 m/min to about 10 m/min, for example about 0.3 m/min.

The second stage of a polysilazane passivation process includes dissolving the polysilazane in an organic solvent. Organic solvents include ethers and aromatic hydrocarbons. In at least one aspect, the polysilazane is dissolved at 20 wt % in dibutylether. In at least one aspect, a polysilazane is cross-linked in solution by, for example, adding 3 wt % of dicumyl peroxide (DCP) and 0.015 wt % of platinum to the polysilazane.

The polysilazane solution is then applied (passivated) to the carbon fiber by, for example, spraying or dipping. Residense time for applying the polysilazane solution can be from about 30 seconds to about 10 minutes. The polysilazane can be applied to the carbon fiber at an amount of from about 0.001 mg polysilazane/mm² of carbon fiber to about 1 g polysilazane/mm² of carbon fiber, such as from about 0.003 mg/mm² to about 0.007 mg/mm², for example about 0.0038 mg/mm² or 0.0064 mg/mm² to provide a coating sufficient to mask the corrosive effect of oxygen-containing moieties (if any) present on the graphite.

After passivation, the graphite sample is thermally treated at a temperature from about 500° C. to about 700° C. with a heating rate of about 5° Kelvin/min. In at least one aspect, the passivated carbon fiber is thermally treated from about 1 minute to about two hours to remove any volatiles from the passivated carbon fiber while maintaining/promoting the graphite structure. Thermal treatment can be performed by a continuous infrared furnace.

Polysilazanes can be obtained commercially, such as from Clariant Finance (BVI) Limited. In at least one aspect, a polysilazane is represented by formula (I):

where $R^1$, $R^2$ and $R^3$ are independently selected from hydrogen or alkyl, aryl, vinyl or (trialkoxysilyl)alkyl, where n is a positive integer and the polysilazane has a number-average molecular weight of from about 150 g/mol to about 150,000 g/mol.

In at least one aspect, each of $R^1$, $R^2$ and $R^3$ is independently selected from hydrogen, methyl, ethyl, propyl, isopropyl, butyl, isobutyl, tert-butyl, phenyl, tolyl, vinyl, 3-(triethoxysilyl)propyl and 3-(trimethoxysilylpropyl).

In at least one aspect, $R^1$, $R^2$ and $R^3$ are each hydrogen.

In at least one aspect, a polysilazane is represented by formula (II):

where $R^1$, $R^2$, $R^3$, $R^4$, $R^5$ and $R^6$ are independently selected from hydrogen, alkyl, aryl, vinyl or (trialkoxysilyl)alkyl and n and p are each a positive integer and the polysilazane has a number-average molecular weight of from about 150 g/mol to about 150,000 g/mol.

In at least one aspect, $R^1$, $R^3$, and $R^6$ are hydrogen and $R^2$, $R^4$ and $R^5$ are methyl.

In at least one aspect, $R^1$, $R^3$, and $R^6$ are hydrogen, $R^2$ and $R^4$ are methyl, and $R^5$ is vinyl.

In at least one aspect, $R^1$, $R^4$, and $R^6$ are hydrogen, and $R^2$ and $R^5$ are methyl.

In at least one aspect, a ratio of n to p is from about 2:1 to about 4:1.

In at least one aspect, a polysilazane is represented by formula (III):

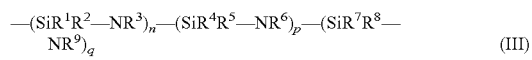

where $R^1$, $R^2$, $R^3$, $R^4$, $R^5$, $R^6$, $R^7$, $R^8$, and $R^9$ are independently selected from hydrogen, alkyl, aryl, vinyl or (trialkoxysilyl)alkyl and n, p, and q are each a positive integer and the polysilazane has a number-average molecular weight of from about 150 g/mol to about 150,000 g/mol.

In at least one aspect, $R^1$, $R^3$, and $R^6$ are hydrogen, $R^2$, $R^4$, $R^5$ and $R^8$ are methyl, $R^9$ is (triethoxysilyl)propyl and $R^7$ is alkyl or hydrogen.

In at least one aspect, a method for passivating a carbon fiber material includes contacting a carbon fiber (e.g., graphite fiber) with an acid. The method includes dissolving a polysilazane in an organic solvent to form a solution and applying the solution to the carbon fiber by, for example, spraying or dipping. The method includes thermally treating the passivated carbon fiber material at a temperature from about 500° C. to about 700° C. with a heating rate of about 5° Kelvin/min.

In at least one aspect, a carbon fiber material comprises a polysilazane coating disposed thereon. In at least one aspect, a polysilazane is or is the reaction product of a polysilazane represented by formula (I):

where $R^1$, $R^2$ and $R^3$ are independently selected from hydrogen or alkyl, aryl, vinyl or (trialkoxysilyl)alkyl, where n is a positive integer and the polysilazane has a number-average molecular weight of from about 150 g/mol to about 150,000 g/mol.

In at least one aspect, each of $R^1$, $R^2$ and $R^3$ is independently selected from hydrogen, methyl, ethyl, propyl, isopropyl, butyl, isobutyl, tert-butyl, phenyl, tolyl, vinyl, 3-(triethoxysilyl)propyl and 3-(trimethoxysilylpropyl).

In at least one aspect, $R^1$, $R^2$ and $R^3$ are each hydrogen.

In at least one aspect, a polysilazane is represented by formula (II):

(II)

where $R^1$, $R^2$, $R^3$, $R^4$, $R^5$ and $R^6$ are independently selected from hydrogen, alkyl, aryl, vinyl or (trialkoxysilyl)alkyl and n and p are each a positive integer and the polysilazane has a number-average molecular weight of from about 150 g/mol to about 150,000 g/mol.

In at least one aspect, $R^1$, $R^3$, and $R^6$ are hydrogen and $R^2$, $R^4$ and $R^5$ are methyl.

In at least one aspect, $R^1$, $R^3$, and $R^6$ are hydrogen, $R^2$ and $R^4$ are methyl, and $R^5$ is vinyl.

In at least one aspect, $R^1$, $R^4$, and $R^6$ are hydrogen, and $R^2$ and $R^5$ are methyl.

In at least one aspect, a ratio of n to p is from about 2:1 to about 4:1.

In at least one aspect, a polysilazane is represented by formula (III):

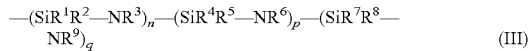

(III)

where $R^1$, $R^2$, $R^3$, $R^4$, $R^5$, $R^6$, $R^7$, $R^8$, and $R^9$ are independently selected from hydrogen, alkyl, aryl, vinyl or (trialkoxysilyl)alkyl and n, p, and q are each a positive integer and the polysilazane has a number-average molecular weight of from about 150 g/mol to about 150,000 g/mol.

In at least one aspect, $R^1$, $R^3$, and $R^6$ are hydrogen, $R^2$, $R^4$, $R^5$ and $R^8$ are methyl, $R^9$ is (triethoxysilyl)propyl and $R^7$ is alkyl or hydrogen.

Dibromocarbene Passivation:

In a dibromocarbene passivation process, dibromocyclopropyl moieties are formed on a fiber surface. The dibromo groups of the fiber surface can be reacted with other molecules, such as those with diol functionality to form covalently bonded multilayer coating structures. The dibromo groups of the fiber surface can also be reacted with activated Zn and subsequent carbonyl-containing substituents.

In a dibromocarbene passivation process, a fiber is added to a benzene bath at an initial concentration of fiber of about 3 mg/mL benzene. Bromoform is then added to the benzene solution (e.g., to a concentration of 10 mL bromoform/23 mL benzene). An amine-containing phase transfer catalyst (e.g., amine catalyst), such as trihexylamine, is also added to the benzene solution (e.g., to a concentration of 2 mL trihexylamine/23 mL benzene).

The supernatant of the solution is then added (e.g., dropwise) to a stirring aqueous solution of sodium hydroxide (e.g., 0.125 M) to form a biphasic benzene and aqueous sodium hydroxide mixture that is allowed to stir (e.g., from about 24 hours to about 72 hours, for example about 48 hours) at a temperature from about 60° C. to about 80° C., for example about 70° C. Without being bound by theory, the addition of a phase-transfer catalyst, trihexylamine, facilitates the migration of carbenes generated at the phase boundary by the formation of ylide intermediates. $Br_2C^-N^+(C_6H_{13})_3$ ylides in turn react with carbon fibers, yielding carbon fibers having dibromocyclopropyl groups. The organic phase of the biphasic mixture is filtered, for example, using a membrane filtration apparatus (e.g., Whatman, Anodisc 200 nm). The residual solid product is washed, for example, with toluene and/or tetrahydrofuran and then resuspended in toluene. This toluene organic phase is then extracted an additional three times using water (to remove any remaining salt from the toluene solution) and dried over calcium carbonate or magnesium sulfate (to remove water present in the organic toluene phase). The obtained toluene organic phase containing the dibromocyclopropyl-functionalized fiber is then dried (e.g., under vacuum and heated).

Preferably, exfoliation/sonication is avoided for a dibromocarbene passivation process of the present disclosure in order to reduce or prevent the disaggregation of graphite fibers into graphene in example where the carbon fiber used is graphite.

After passivation of a carbon fiber of the present disclosure, the fiber can be evaluated electrochemically by placing the fiber in an electrolyte (e.g., phosphate buffered saline (PBS)) and scanning the potential for indication of oxygen reduction current. The ratio of the current measured to the current of a graphite fiber without passivation will yield a passivation efficiency. Currents can range from microamps to milliamps depending on the surface area of the carbon fiber. The galvanic corrosion of passivated graphite fibers of the present disclosure can be assessed in a cyclic corrosion chamber according to ASTM G85. An air-dried electrode is introduced into a solution containing 3.5% pH 7 PBS Buffer. About 8 mm of a passivated graphite rod is then introduced into the PBS solution. Electrochemical experiments, such as cyclic voltammetry 20 mV/s vs. SCE, are then performed to verify oxygen reduction reaction inhibition.

In at least one aspect, a method for passivating a carbon fiber material includes introducing a carbon fiber material (e.g., graphite) to a benzene bath. The method includes introducing bromoform to the benzene solution. The method includes introducing an amine-containing phase transfer catalyst (e.g., amine catalyst), such as trihexylamine to the benzene solution. The method includes introducing the benzene solution to an aqueous solution of sodium hydroxide to form a biphasic mixture and optionally stirring the biphasic mixture. The method includes filtering the organic phase of the biphasic mixture and washing the solid product with toluene and/or tetrahydrofuran. The method includes resuspending the solid in toluene. The method includes drying the solid under vacuum and optionally heating.

In at least one aspect, a carbon fiber material comprises a dibromocarbene coating disposed thereon. A dibromocarbene coating comprises and/or is the reaction product of one or more dibromocarbenes.

Fiber Composite Formation

At block 208, method 200 includes arranging the passivated fiber into a composite containing the fibers. A composite has a composite structure that is a mat, a tow, a laminate (a layered structure or a ply), a braid, or a filament. A composite is arranged during manufacture of the vehicle component with the fibers oriented in one or more directions in sufficient concentrations to provide a desired strength and stiffness in the resulting product form after curing. Fiber tows can be woven to produce a fabric, such as a plain weave or satin weave cloth. For in-plane loading, a laminated or plywood type of construction is used including layers or plies of unidirectional or bi-directional orientated fibers. Alternatively, the fibers are arranged by one or more textile techniques, such as weaving, braiding, or filament winding.

Thus, to obtain the desired mechanical properties of a fiber, the fiber layers or plies in a laminate are arranged at angles from about 0° to about 90° relative to a 0° primary loading direction. In at least one aspect, a fiber mat has a combination of 0°, +/−45° C., and 90° C. orientations, which reduces or prevents distortion of the component after cure and under service loading. The laminate is stiffest and strongest (in-plane) in the direction with the highest concentration of 0° fibers, and the laminate is said to be orthotropic.

When the ply configuration is made of equal numbers of plies at 0°+/−60° or 0°, +/−45°, and 90°, the in-plane mechanical properties do not vary much with loading direction and the composite is then said to be quasi-isotropic. Because the quasi-isotropic configuration has a stress concentration factor similar to that of an isotropic material, it is also used where local stresses are high, such as in a mechanical joint.

In at least one aspect, a fiber composite is cowoven with one or more additional fibers/composites. Additional fibers include glass or aramid fibers. In at least one aspect, one or more additional fibers are woven in the 0° or warp direction (the roll direction) or in the 90° (weft) direction.

In at least one aspect, forming a fiber composite includes holding a carbon fiber in a stationary position using a knitting yarn during weaving to avoid fiber crimping (waviness). These non-crimp fabrics can contain fibers orientated at 0°, 90°, and +/−45° in any desired proportions. Because of the reduction or elimination in fiber waviness, composites based on non-crimp fabric show a significant improvement in compression strength compared with those based on woven materials. Stiffness in both tension and compression is also increased by about 10% as compared with composites based on woven materials.

Composition and Component Formation

At block 210, method 200 includes combining the fiber composite with a polymer to form a composition of the present disclosure. Combining includes infiltrating a carbon fiber or carbon fiber composite of the present disclosure with a liquid polymer that is then cured/solidified (e.g., by heating or cooling) to form a continuous solid matrix. For example, a thermoset is cured by heating or a thermoplastic is crystallized by cooling. Alternatively, single fibers or a composite of fibers (e.g., tows of fibers or sheets of aligned fibers) is coated or intermingled with solid polymer or polymer precursor and the composition formed by flowing the coatings together (and curing if required) under heat and pressure.

A polymer is a thermosetting or thermoplastic polymer. Thermosetting polymers are long-chain molecules that cure by cross-linking to form a three dimensional network which does not readily melt or reform. These polymers can provide fabrication of compositions at relatively low temperatures and pressures because they pass through a low-viscosity stage before polymerization and cross-linking (if any). In at least one aspect, a polymer is at least one of an epoxy, a bismaleimide, or a polyaryletherketone (such as a polyetheretherketone or a polyetherketone).

Epoxies have sufficient mechanical properties for use as aircraft coatings, have low shrinkage and form adequate bonds to fibers. Epoxies pass through a low-viscosity stage during the cure, which provides the use of liquid resin-forming techniques such as resin-transfer molding. Compositions comprising epoxies that cure at 120° C. and 180° C. can have upper service temperatures of about 100° C. to about 150° C.

Bismaleimide resins have desirable formability and mechanical properties similar to epoxies and can operate at higher temperatures than epoxies. Compositions comprising bismaleimide that cure at about 200° C. can have upper service temperatures above 180° C.

A polymer of the present disclosure can be a thermoplastic polymer. Thermoplastic polymers are linear (non-cross-linked) polymers that can be melted and reformed. High-performance thermoplastics for use as aircraft coatings include polymers such as polyetheretherketone which can be cured up to about 120° C., polyetherketone which can be cured up to about 145° C., and polyimide which can be cured up to about 270° C. Thermoplastic polymers are advantageous because they have higher strains to failure than thermoset polymers because thermoplastic polymers can undergo plastic deformation.

Because thermoplastic polymers are already polymerized, they can form very high viscosity liquids when melted. Fabrication techniques can be based on resin-film (or resin-fiber) infusion and pre-preg techniques. The fibers are coated with the polymer (from a solvent solution) and the resulting part is then consolidated under high temperature and pressure. Alternatively, sheets of thermoplastic film can be layered between sheets of dry fiber or fibers of thermoplastic can be woven through the carbon fibers and the composite consolidated by hot pressing. Furthermore, because thermoplastics absorb very little moisture, they have better hot/wet property retention than thermosetting composites, but do involve higher temperature processing.

The polymer of the present disclosure forms the shape of the composition and can transfer load into and out of the fibers, can separate the fibers so adjacent fibers are protected if one fails, and/or can protect the fiber from the surrounding environment. The fiber can interact with (e.g., bond to) the polymer to provide toughness to the overall composition. The location(s) where the fiber interacts with the polymer is known as the interface or interphase.

Combining a fiber or fiber composite with a polymer to form a composition of the present disclosure includes impregnating or coating (e.g., dipping or spraying) a fiber (or fiber composite) with a liquid polymer to form a mixture that is then cured. This can be referred to as resin-transfer molding and can be used, for example, if the polymer has a low-viscosity (e.g., less than 1,000 centipoise (cps)).

Alternatively, combining a fiber (or fiber composite) with a polymer to form a composition of the present disclosure includes infusing a melted polymer film into a fiber (or fiber mat) under pressure and then curing. This can be referred to as resin-film infusion.

Alternatively, combining a fiber (or fiber composite) with a polymer to form a composition of the present disclosure includes pre-impregnating fiber sheet bundles or tows with a liquid resin (pre-preg) for subsequent arrangement (stacking) followed by consolidation and cure under temperature and pressure. For thermoset composites starting at room temperature, the temperature can be increased up to a temperature of about 350° F.), the pressure of the environment is increased (e.g., up to about 200 psi), and the high temperature, high pressure condition is maintained for up to several hours depending on the material, then is allowed to cool to room temperature/ambient pressure.

In at least one aspect, a plurality of cured compositions (e.g., fibers impregnated or coated with a liquid polymer) are stacked and consolidated at a temperature from about 250° F. to about 600° F. to form a consolidated composition.

As shown at block 212, method 200 includes depositing a composition of the present disclosure onto a metal substrate. Metal substrates include steel, aluminum, titanium, magnesium, tantalum, copper, and alloys thereof. Depositing can include any suitable "lay up" process or "collation"

process known in the art. For example, a composition of the present disclosure can be cut to match the shape of a metal substrate and deposited onto the metal. The deposited composition is "debulked" by placing the deposited composition in a vacuum bag and pulled to a pressure of 980 mbar or greater for a time period from about 1 minute to about 30 minutes. The composition can be deposited as tiles or as a continuous piece. A breather material can be used and can connect to the vacuum ports of the vacuum bag.

At block 214, the composition is cured, to fabricate a part, such as a coated vehicle component of a vehicle, such as an aircraft, a car, a train, a boat, or a wind turbine. In at least one aspect, a composition of the present disclosure is cured at a temperature from about 20° C. to about 300° C., such as from about 100° C. to about 200° C. A vehicle component is any suitable component of a vehicle, such as a structural component, such as landing gear(s), a panel, or joint, of an aircraft, etc. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. In at least one aspect, a vehicle is an aircraft, a car, a train, or a boat. In at least one aspect, a part is a part of a wind turbine.

Figure 3:
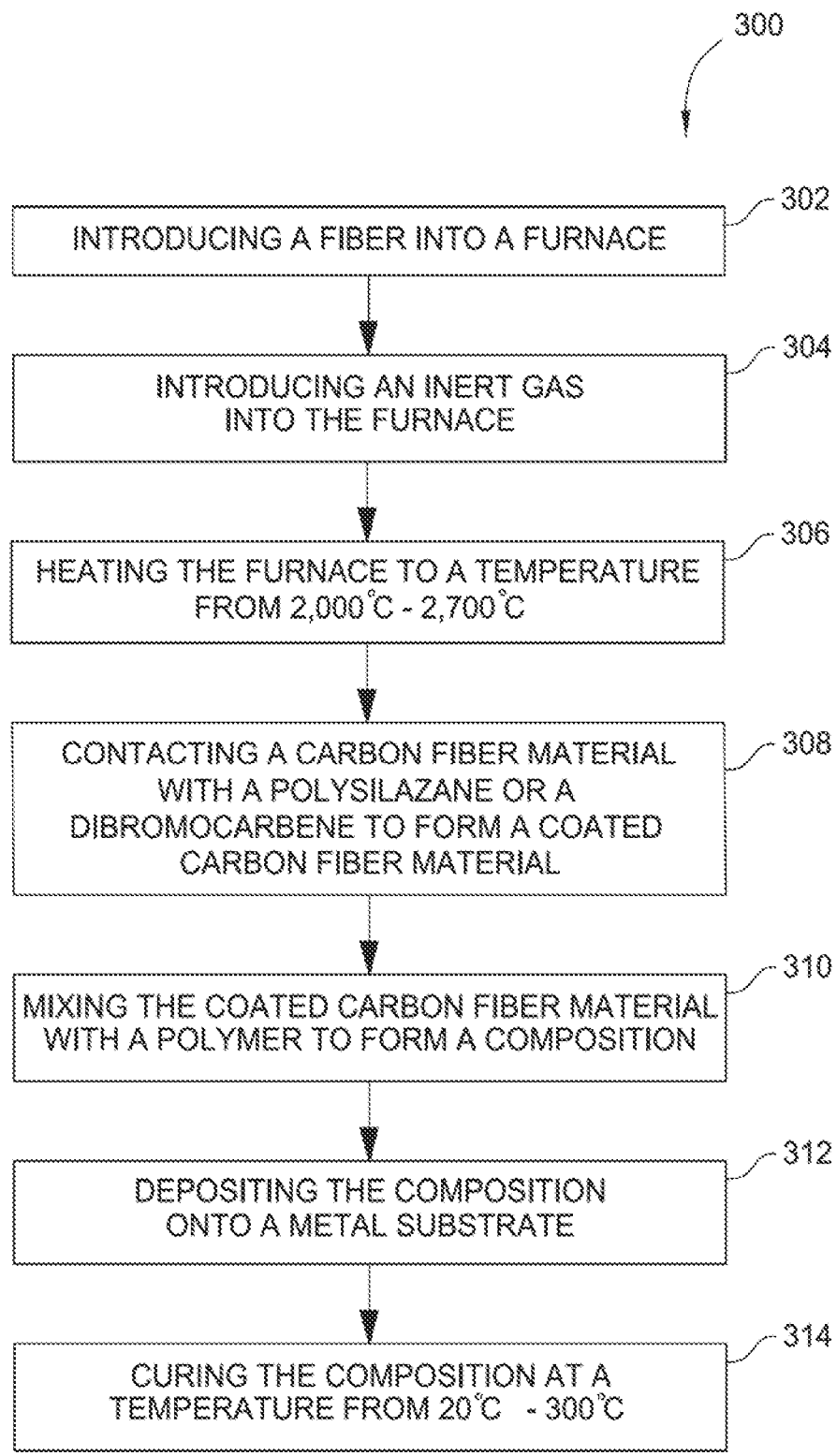
FIG. 3 is a flow diagram of a method for manufacturing components having passivated graphite fiber-containing coatings disposed thereon.

FIG. 3 is a flow diagram of a method 300 for manufacturing components having passivated graphite fiber-containing coatings disposed thereon. As shown in FIG. 3, method 300 introducing a fiber into a furnace (Block 302), introducing an inert gas into the furnace (Block 304), and heating the furnace to a temperature from about 2,000° C. to about 2,700° C. (Block 306). Method 300 includes contacting a carbon fiber material, such as graphite, with a polysilazane or a dibromocarbene to form a coated carbon fiber material (Block 308). Method 300 includes mixing the coated carbon fiber material with a polymer selected from a thermosetting polymer or a thermoplastic polymer to form a composition (Block 310). Method 300 includes depositing the composition onto a metal substrate (Block 312). Method 300 includes curing the composition at a temperature from about 20° C. to about 300° C. (Block 314).

Overall, compositions and methods of the present disclosure provide corrosion inhibition of a metal substrate and, in aspects where the metal substrate is an aircraft component, a composition disposed on a metal substrate without the need for an intermediate fiberglass layer between the metal substrate and the composition, which reduces the weight of the aircraft from hundreds to thousands of pounds (lbs).

Definitions

The term "alkyl" includes a substituted or unsubstituted, linear or branched acyclic alkyl radical containing from 1 to about 20 carbon atoms. In at least one aspect, alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, and structural isomers thereof.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO—wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A composition comprising:
   a carbon fiber material comprising a polysilazane covalently bonded to the carbon fiber material; and
   a polymer selected from a thermosetting polymer or a thermoplastic polymer.

2. The composition of claim 1, wherein the carbon fiber material has a composite structure selected from a mat, a tow, a layered structure, a ply, a braid, or a filament.

3. The composition of claim 2, wherein the carbon fiber material is graphite.

4. The composition of claim 1, wherein the polymer is an epoxy, a bismaleimide, a polyimide, or polyaryletherketone.

5. The composition of claim 4, wherein the composition comprises the polymer from about 30 wt % to about 60 wt % based on the total weight of the composition.

6. The composition of claim 5, wherein the composition comprises the carbon fiber material from about 50 wt % to about 70 wt % based on the total weight of the composition.

7. A metal substrate comprising a composition disposed thereon, wherein the composition comprises:
   a carbon fiber material comprising a polysilazane covalently bonded to the carbon fiber material; and
   a polymer selected from a thermosetting polymer or a thermoplastic polymer.

8. The metal substrate of claim 7, wherein the metal is steel, aluminum, titanium, magnesium, tantalum, copper, or an alloy thereof.

9. The metal substrate of claim 8, wherein the composition is disposed on the substrate at a thickness from about 1 micron to about 100 microns.

10. A vehicle component comprising the metal substrate of claim 9.

11. The vehicle component of claim 10, wherein the vehicle component is a rotor blade, a landing gear, an auxiliary power unit, a nose of an aircraft, a fuel tank, a tail cone, a panel, a coated lap joint between two or more panels, a wing-to-fuselage assembly, a structural aircraft composite, a fuselage body-joint, or a wing rib-to-skin joint.

12. A method for manufacturing a component, comprising:
   contacting a carbon fiber material with a polysilazane to form a coated carbon fiber material, wherein the coated carbon fiber material comprises the polysilazane is covalently bonded to the carbon fiber material; and
   mixing the coated carbon fiber material with a polymer selected from a thermosetting polymer or a thermoplastic polymer to form a composition.

13. The method of claim 12, further comprising depositing the composition onto a metal substrate.

14. The method of claim 12, wherein the carbon fiber material comprises graphite, and the method further comprises:
   introducing a fiber into a furnace;
   introducing an inert gas into the furnace; and
   heating the furnace to a temperature from about 2,000° C. to about 2,700° C. to form the graphite.

15. The method of claim 12, wherein contacting further comprises contacting the carbon fiber material with an acid.

16. The method of claim 15, wherein contacting the carbon fiber material with the acid comprises immersing the carbon fiber material in a solution comprising the acid for from about 0.5 seconds to about 1 minute and removing the carbon fiber material from the solution comprising the acid at a rate of about 0.3 m/min.

17. The method of claim 15, wherein contacting the carbon fiber material with the polysilazane comprises:
   dissolving the polysilazane in a solvent; and
   applying an amount of the polysilazane to the carbon fiber material from about from about 0.003 mg polysilazane/mm² of carbon fiber material to about 0.007 mg polysilazane/mm² of carbon fiber material.

18. The method of claim 17, further comprising thermally treating the carbon fiber material at a temperature from about 500° C. to about 700° C. after applying the polysilazane to the carbon fiber material.

19. The method of claim 15, wherein the polysilazane is represented by formula (I):

$$-(SiR^1R^2-NR^3)_n- \qquad (I)$$

wherein:
$R^1$, $R^2$ and $R^3$ are independently selected from hydrogen, alkyl, aryl, vinyl, or (trialkoxysilyl)alkyl;
n is a positive integer, and the polysilazane has a number-average molecular weight of from about 150 g/mol to about 150,000 g/mol.

20. The method of claim 15, wherein contacting the carbon fiber material with the polysilazane comprises:
   dissolving the polysilazane in a solvent; and
   applying an amount of the polysilazane to the carbon fiber material from about from about 0.003 mg polysilazane/mm² of carbon fiber material to about 0.007 mg polysilazane/mm² of carbon fiber material, wherein the polysilazane is represented by formula (I):

$$-(SiR^1R^2-NR^3)_n- \qquad (I)$$

wherein:
$R^1$, $R^2$ and $R^3$ are independently selected from hydrogen, alkyl, aryl, vinyl, or (trialkoxysilyl)alkyl;
n is a positive integer, and the polysilazane has a number-average molecular weight of from about 150 g/mol to about 150,000 g/mol.

* * * * *